(12) United States Patent
Naum

(10) Patent No.: US 9,566,520 B2
(45) Date of Patent: *Feb. 14, 2017

(54) METHOD, SYSTEM, AND PROGRAM PRODUCT FOR A RECREATIONAL GAME

(71) Applicant: Lucian S. Naum, San Martin, CA (US)

(72) Inventor: Lucian S. Naum, San Martin, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/077,193

(22) Filed: Nov. 11, 2013

(65) Prior Publication Data

US 2015/0133217 A1    May 14, 2015

(51) Int. Cl.
| | |
|---|---|
| *A63F 13/57* | (2014.01) |
| *A63B 71/00* | (2006.01) |
| *A63B 43/00* | (2006.01) |
| *A63B 43/02* | (2006.01) |
| *A63H 33/18* | (2006.01) |
| *A63F 13/80* | (2014.01) |

(52) U.S. Cl.
CPC ............ *A63F 13/57* (2014.09); *A63B 43/002* (2013.01); *A63B 43/02* (2013.01); *A63B 71/0054* (2013.01); *A63F 13/80* (2014.09); *A63H 33/18* (2013.01); *A63B 2043/001* (2013.01); *A63B 2071/0063* (2013.01); *A63B 2210/50* (2013.01)

(58) Field of Classification Search
None
See application file for complete search history.

(56) References Cited

U.S. PATENT DOCUMENTS

| | | | |
|---|---|---|---|
| 563,170 A * | 6/1896 | Haley et al. | .................. 473/595 |
| 3,106,397 A * | 10/1963 | Lacey | ..................... A63B 43/04 |
| | | | 446/409 |
| 3,458,949 A | 8/1969 | Young | |
| 4,309,038 A | 1/1982 | Spoon | |
| 5,199,716 A | 4/1993 | DeFluiter | |
| 5,297,981 A | 3/1994 | Maxim | |
| 5,975,982 A * | 11/1999 | Spector | ......................... 446/397 |
| 6,264,522 B1 | 7/2001 | Dickson | |

(Continued)

OTHER PUBLICATIONS

Rossmann. An Experimental Study of Wiffle Ball Aerodynamics [online], Dec. 2007 [retreived on Jul. 10, 2015]. Retreived from the Internet: <URL: http://www.rpi.edu/dept/chem-eng/WWW/faculty/plawsky/Comsol%20Modules/Whiffle/WiffleBallAerodynamics.pdf>.*

(Continued)

*Primary Examiner* — Kang Hu
*Assistant Examiner* — Robert T Clarke, Jr.
(74) *Attorney, Agent, or Firm* — Ariel S. Bentolila; Bay Area IP Group LLC

(57) ABSTRACT

As one implementation example, an application comprising a recreational game performs a method comprising displaying at least a portion of a recreational object. The recreational object comprises a central portion comprising a center and a plurality of arm members in which the arm members are joined to the central portion and balanced about the center, the arm members each comprising a channel for enabling air passage through the arm members and into the central portion in which the air passage affects a flight speed and a rotational speed of the recreational object passing through air. The method further comprises receiving input from an application user, the input operable to manipulate the recreational object to achieve a goal of the recreational game.

19 Claims, 6 Drawing Sheets

(56) References Cited

U.S. PATENT DOCUMENTS

| | | | |
|---|---|---|---|
| D519,588 S | 4/2006 | Carbonero | |
| D561,277 S | 2/2008 | Chernick | |
| D582,998 S | 12/2008 | Chernick | |
| D596,681 S | 7/2009 | Chernick | |
| 7,789,727 B2 | 9/2010 | Chernick | |
| 2001/0031677 A1 | 10/2001 | Coleman | |
| 2002/0137582 A1* | 9/2002 | Yu | 473/570 |
| 2005/0101365 A1* | 5/2005 | Ogita et al. | 463/7 |
| 2006/0080539 A1* | 4/2006 | Asami et al. | 713/182 |
| 2007/0270233 A1 | 11/2007 | Ruston | |
| 2009/0068924 A1* | 3/2009 | Chernick et al. | 446/397 |
| 2014/0080556 A1* | 3/2014 | Knutsson | 463/7 |
| 2015/0105159 A1* | 4/2015 | Palotas | 463/37 |

OTHER PUBLICATIONS

Insturction Manual for Katamari Damacy. Dated 2003 [retreived on Jul. 10, 2015]. Retreived from the Internet: <URL:http://www.replacementdocs.com/download.php?view.2580>.*

* cited by examiner

METHOD, SYSTEM, AND PROGRAM PRODUCT FOR A RECREATIONAL GAME

CROSS-REFERENCE TO RELATED APPLICATIONS

The present continuation patent application claims priority benefit under 35 U.S.C. 120 of the U.S. nonprovisional patent application Ser. No. 13/368,290 entitled "A Recreational Object," filed on 7 Feb. 2012. The contents of this related patent application is incorporated herein by reference for all purposes to the extent that such subject matter is not inconsistent herewith or limiting hereof.

RELATED CO-PENDING U.S. PATENT APPLICATIONS

The following related U.S. patent application(s), submitted by at least one of the present Applicant(s)/Inventor(s) is/(are) recently co-pending: U.S. utility patent application Ser. No. 13/368,290 entitled "A Recreational Object" submitted to the United States Patent and Trademark Office (USPTO) on 7 Feb. 2012

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to recreational games. More particularly, one or more embodiments of the invention relate to recreational objects, physical or virtual, used in recreational games, physical or virtual.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typical recreational objects include spherically shaped balls, oblong balls and disc shaped objects. These recreational objects may be used in a large space by one or more users. These objects may also be difficult to master. Additionally, these objects may be highly influenced by wind and are difficult to control. Often, these objects will make contact with something the user did not intend or travel a larger distance than intended by the user.

Typical video games do not include recreational objects with multiple arms that may be used in a variety of different games and may be altered to change the difficulty of the game.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a three dimensional view. FIG. 1B is top view;

Figure 1A:
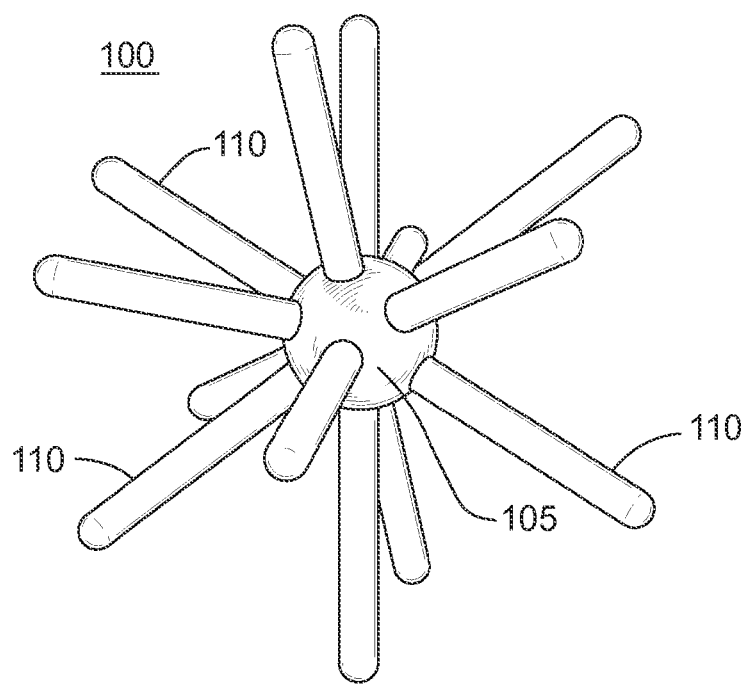
FIGS. 1A and 1B illustrate an exemplary recreational object including a ball attached to a plurality of arms in accordance with the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

An embodiment of the present invention may be implemented as a recreational object including a ball and a least one attached arm. In some embodiments of the invention a plurality of arms may be implemented. In at least one practical embodiment of the invention the arm may include an inner material disposed in an outer casing. In some practical embodiments the inner material may be a high density polyethylene. In some other practical embodiments the inner material may be wood, hard rubber and steel. In some practical embodiments computer generated images may be used in computer games. An attachment mechanism is provided at a first end of the arm. In at least one practical embodiment a void is provided at a second end of the arm to provide a collapsible portion upon impact. In some practical embodiments the recreational object has a weight of about 10-12 ounce. In other embodiments the recreational object may weigh more or less. A practical effect of the present invention is that it allows to the recreational object to have a free random rotation in flight offering equal possibility of exposure for each arm to the intended target or caching partner. Another practical effect of the present invention may be to limit the effect of wind on the recreational object. The hollow construction with open holes at the end of the arms enables the recreational object to be influenced by Bernoulli principle when in flight limiting the speed of flight and the speed of rotation to manageable levels for recreational games. The recreational object may be the main object in a family of games just like the round ball is the main object in many games. The advantages of these games may be smaller required spaces for game play, a high diversity of games based on properly design devices to accommodate the object's physical properties, and affordable beach, camp ground and back yard games.

The recreational object, without limitation, has the unique qualities of acting as a distributor of mechanical and electrical charges. If a force or torque is applied to one of the arms, the charge will be distributed by the surface of the ball. This distribution may occur through an intricate system of forces and torques in the arms which oppose and absorb the generating charge. As an example, in case of an electrical charge, positive or negative, the ball will equally distribute the charges between the arms and may levitate if placed in certain various electrically charged environments.

In some practical embodiments of the invention there are 14 arms spaced about a round center. This may provide for a balanced recreational object with random rotation in flight, limited rolling capacity with increasing stopping power on the ground, and minimal wind influence when in flight. If the number of arms is decreased to 6 the balance will still be there but the rotation capability will be decreased and the rolling on the ground may be minimized. If the number of arms is increased the balance of the object will be affected, the rolling on the ground will be enhanced and the random rotation will be affected. In some practical embodiments of the invention the design of the arms allows unobstructed access for hands or parts of the additional devices (which might be used in the creation of different games) between arms. The built in slow down system with hollow construction with open holes at the end of the arms may keep the speed and rotation to comfortable values for human perception. The weight (approx 10 to 12 oz) and the build in safety system, with the void provided at the end of the arm to provide a collapsible portion upon impact, provide a versatile recreational object.

In some embodiments, the recreational object may be used as part of a variety of games. These games may include computer, console, and other video games in which the recreational object is a virtual object. The recreational object used in these games may have many variations, some of which, without limitation, are described in the preceding and following disclosure. These variations can be used, without limitation, to change the degree of difficulty of the game and to create different games.

Figure 1B:
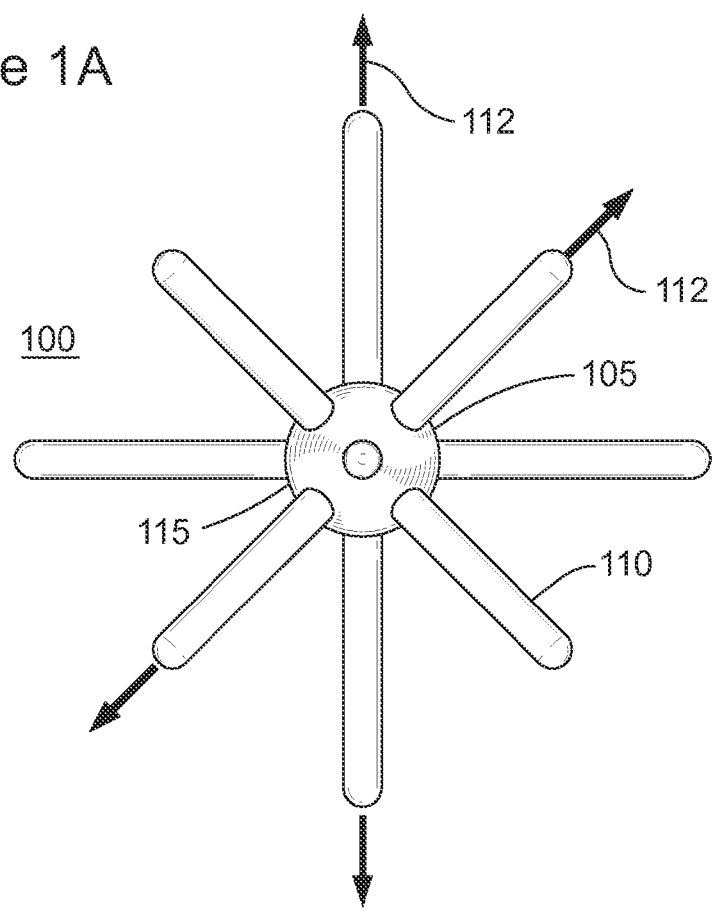

Referring initially to FIG. 1A, an exemplary embodiment of a ball 105 attached to an arm 110 is illustrated. Suitable shapes for the ball, include but are not limited to, a sphere and a prolate spheroid. FIG. 1B illustrates an exemplary ball 105 attached to an arm 110 by an attachment mechanism 115 in accordance with an embodiment of the present invention. Suitable attachment mechanisms include, but are not limited to, adhesives, screws, and clamps. The ball also includes at least one axis 112. In some embodiments the ball may have seven axes. In some other embodiments the ball may have between three and eleven axes. In at least one practical embodiment, each axis may comprise two arms 110 along XYZ axes and one in the center each of ⅛ of the sphere created by the first axes for a total of 14 where the angle between the arms is about 60 degrees. In at least one practical embodiment the ball may be attached to fourteen arms. In at least one embodiment the ball may be attached to between six and 22 arms. Generally, the placement of the arms 110 may be determined as follows: Take the ball 105 and draw a circle on its surface to divide the ball 105 into two equal hemispheres—North and South. Then draw another circle perpendicular to the first one to divide the ball 105 into two equal hemispheres—West and East. A third circle perpendicular to the first two divides the West and East hemispheres in two equal parts so the result will be a ball 105 divided in eight equal parts, resembling 8 equal isosceles triangles curved according to the surface of the ball 105. For each triangle, draw the median lines between each corner and the middle of the opposite line. At the intersections of these three lines (for each of the eight triangles) is the centroid of the triangle. The arms 110 (and holes 220) are placed on each of the circle intersections for a total of six and in each centroid for a total of eight, thus giving a grand total of 14. For alternatives with 22 arms 110 (or even more) we follow the same construction but instead divide each of the eight triangles in two. This results in placement of the arms 110 at definite points, which allows for balanced flight and equal and random rotation in the air.

Figure 2:
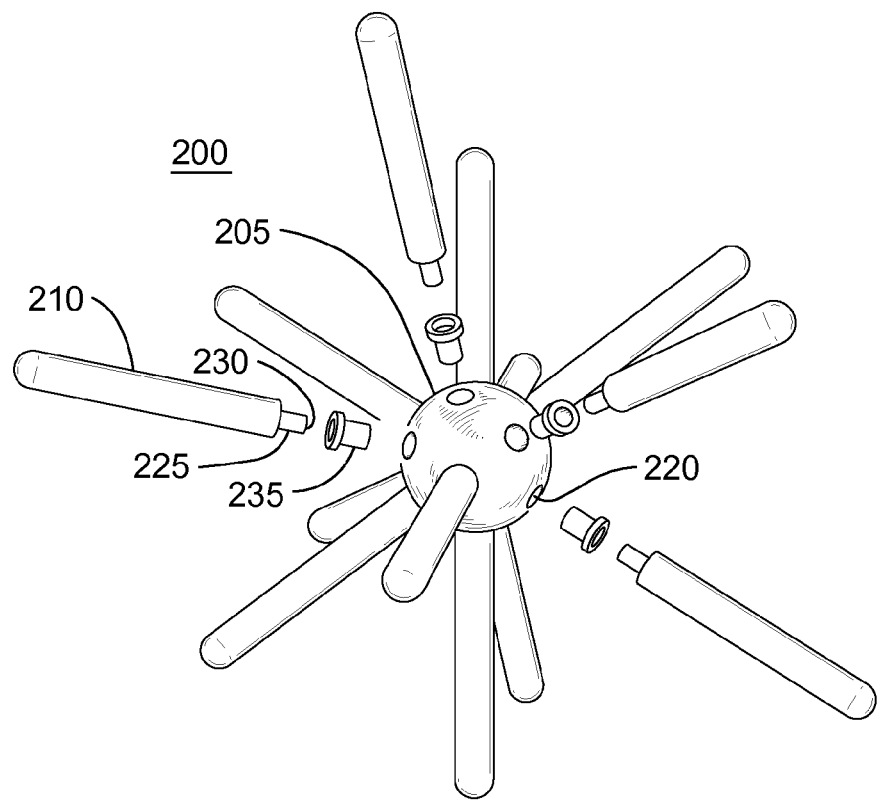
FIG. 2 is an exploded view of an exemplary recreational object in accordance with an embodiment of the present invention.

FIG. 2 illustrates an exploded view of an exemplary ball 205 attached to an arm 210 in accordance with an embodiment of the present invention. In the present embodiment the attachment mechanism includes a peg 225 and a hole 220. In some embodiments a first end 225 of the arm 210 includes the peg 225. In the present embodiment the arm 210 is attached to the ball 205 by inserting the peg 225 into the hole 220 located on the ball. In at least one practical embodiment an insert 235 is also provided. Suitable materials for the insert include, but are not limited to, plastic, rubber, metal, wood, polyethylene, and polyurethane. In at least one practical embodiment the peg 230 is inserted into an opening in the insert 235. The insert is then inserted into the hole 200.

Figure 3:
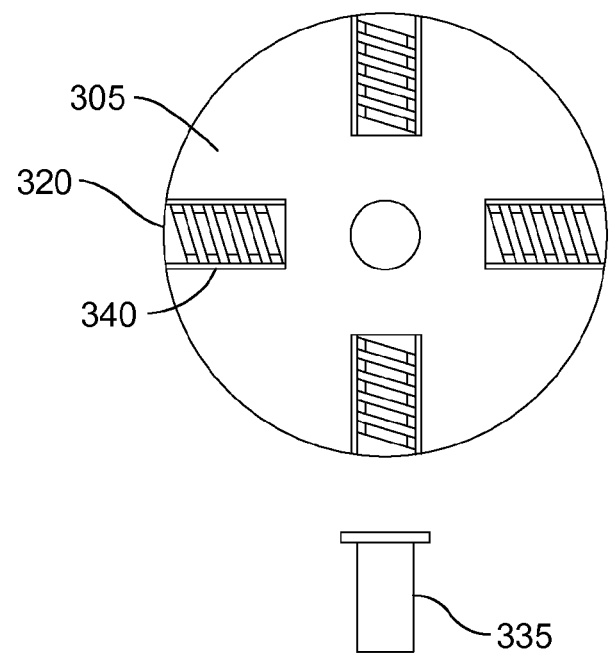
FIG. 3 is an cross sectional view of an exemplary recreational object in accordance with an embodiment of the present invention.

FIG. 3 illustrates an exemplary ball 305 in accordance with an embodiment of the present invention. In at least one practical embodiment of the present invention, a hole 320, disposed in the ball 305, includes threads 340. In at least one practical embodiment a peg includes threads configured to interlock with the threads 340 in the hole 320. In at least one practical embodiment an insert 335 includes threads configured to interlock with the threads 340 in the hole.

Figure 4:
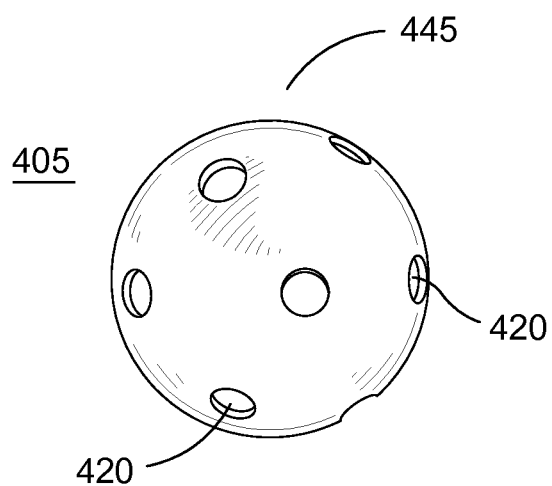
FIG. 4 is a view of an exemplary recreational object in accordance with an embodiment of the present invention.

FIG. 4 illustrates an exemplary ball 405 in accordance with an embodiment of the present invention. In at least one practical embodiment the ball 405 may include a plurality of holes 420 and a hollow interior. The ball also includes a diameter 445. In some embodiments the diameter 445 may be about 4 inches. In another embodiment the diameter 445 may be in the range of 1 to 4.

Figure 5:
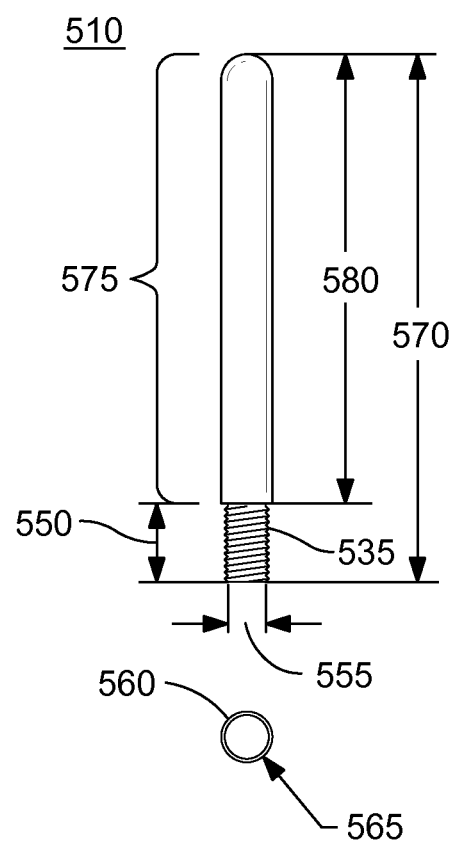
FIG. 5 is an schematic view of an exemplary recreational object in accordance with an embodiment of the present invention.

FIG. 5 illustrates an exemplary arm post 510 for an arm in accordance with an embodiment of the present invention. In at least one practical embodiment the post 510 includes a peg 535. The peg has a height 550 and a width 555. In some embodiments the peg has a height of about 1 inch. In another embodiment the peg may have a height in the range of 0.2 to 1.0 inch. In at least one practical embodiment the peg includes a round end 560. In some practical embodiments the round end has a circumference 565. In some embodiments the circumference 565 is about 0.6 inches. In other embodiments the circumference 565 may be greater than or less than 0.6 inches. The post has a length 570. In some embodiments the length 570 of the post is about 6.75 inches. In another embodiment the length 570 of the post is in the range of 1 to 6.75 inches. A second end 575 of the post has a length 580. In some embodiments the length 580 of the second end of the post is about 5.75 inches. In another embodiment the length 580 of the second end of the post is in the range 1 to 5.80 inches. In at least one practical embodiment the length 570 of each individual post varies. Post 510 is hollow and has an opening or channel at the end distal to peg 535, shown in FIG. 8. This enables air exchange from ambient to hallow ball 405 to limit the speed of flight and the speed of rotation to manageable levels for recreational games.

Figure 6:
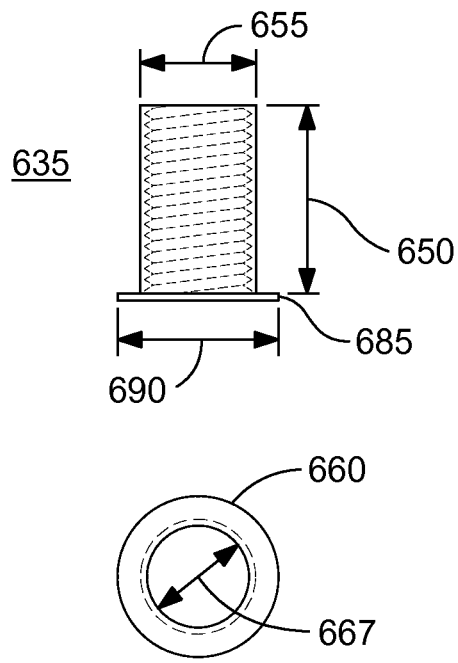
FIG. 6 is an schematic view of an exemplary recreational object in accordance with an embodiment of the present invention.

FIG. 6 illustrates an exemplary peg 635 in accordance with an embodiment of the present invention. The peg 635 has a height 650 and a width 655. In at least one practical embodiment, the peg includes a round end 660. In some practical embodiments the round end has an inner circumference 667. In some embodiments the inner circumference 667 is about 0.5 inches. In other embodiments the inner circumference 667 may be greater than or less than 0.5 inches. In at least one practical embodiment the peg 635 includes a plate 685. Plate 685 contacts ball 405 and may be joined to ball 405 by means such as, but not limited to gluing. The plate 685 includes a width 690. In some embodiments the width 690 is about 0.8 inches. In other embodiments the width 690 may be greater than or less than 0.8 inches. Peg 635 is hollow. Post 510 joins to peg 635.

Figure 7:
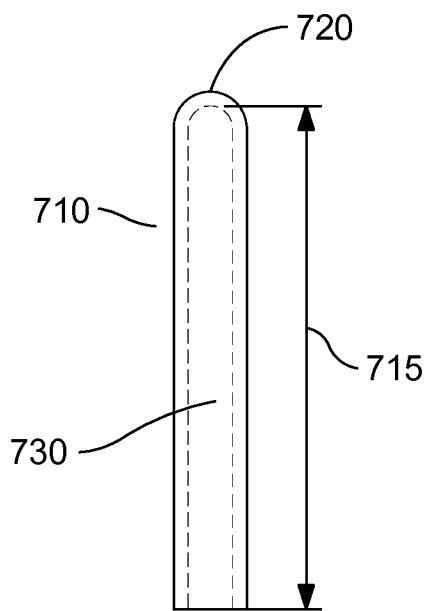
FIG. 7 is an schematic view of an exemplary recreational object in accordance with an embodiment of the present invention.

FIG. 7 illustrates an exemplary arm casing 710 in accordance with an embodiment of the present invention. In many exemplary embodiments the arm casing 710 may comprise resilient closed cell foam such as, but not limited to polyethylene foam. In other embodiments, casing 710 may comprise other materials that are light weight, resilient and durable. Casing 710 comprises a hollow space 730 and an opening or channel 720. Hollow space 730 is configured to enclose post 510. Hollow space 730 comprises a length 715 that may be about 1 inch longer than length 580 of post 510. Casing 710 may be joined to post 510 by means such as, but not limited to gluing. Channel 720 enables air exchange from ambient to post 510 to hallow ball 405 to limit the speed of flight and the speed of rotation to manageable levels for recreational games.

Figure 8:
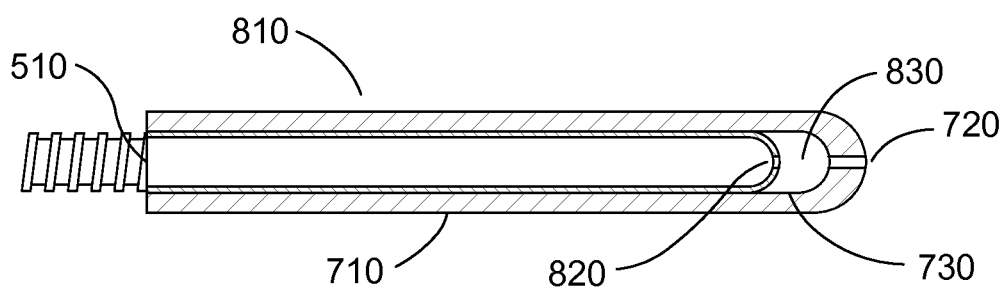
FIG. 8 is an schematic view of an exemplary recreational object in accordance with an embodiment of the present invention.

FIG. 8 illustrates an exemplary arm 810 in accordance with an embodiment of the present invention. In many exemplary embodiments arm 810 comprises post 510 inserted into hollow space 730 of casing 710. Channel 720 enables air to pass through channel 820 of post 510 and into hollow ball 405. Since length 715 is longer than length 580 a bubble 830 is formed between post 510 and casing 710. Bubble 830 acts like a deflating cushion when arm 810 impacts an object or individual. This provides a safety system when playing with the recreational object by mitigating damage to other objects and harm to individuals.

The recreational object of the present embodiment may be used in a variety of games. The recreational object may be displayed, for example, but not limited to, a GUI 940 coupled to a CPU 926, to enable a user to view the operation of the computer operating system and software application. A user input may be received to manipulate the recreational object to achieve a goal of the recreational game. For example, but not limited to, the CPU 926 may be coupled to a pointing device to enable a user with the capability to maneuver a computer cursor about the viewing area of the GUI 940 and select areas or features in the viewing area of the GUI 940. CPU 926 may be coupled to a keyboard 930. The keyboard enables a user with the capability to input alphanumeric textual information to the CPU 926. In some alternative embodiments of the present invention the recreational object may be propelled through a ring as part of game play. In some embodiments a bell is attached to the ring. In some alternative embodiments of the present invention the recreational object may be used as part of a game to collect rings on one or more arms. In some embodiments of the present invention the arms may be configured with a color scheme that signifies some meaning with regard to game play. In at least one practical embodiment each color corresponds to a point value.

In a non-limiting example of game play, the recreational object may be thrown to land between prongs on a rack and slide down into a basket in a HOOK and HOOPS game.

In another non-limiting game play, the recreational object may be thrown through a circle having a bell hanging from it. The object being to not ring the bell in a NO BELL SOUND game.

In another non-limiting game play, the recreational object may be thrown against hanging chains and ring in an attempt to get the chains to hook the recreational object in a HOOK MY SHAPE game.

In another non-limiting game play, the recreational object may be thrown at rings floating on water, on fresh snow, or elevated above a surface in an attempt to pick up one of the rings and rotate have an arm with a ring in an upward position in a GOT A RING game.

Figure 10:
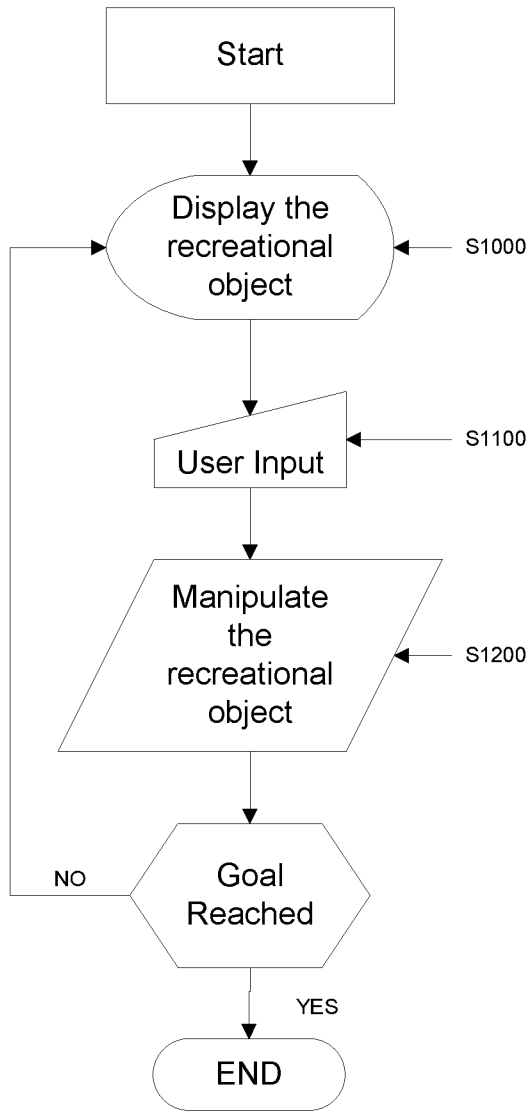
FIG. 10 is a flowchart of an exemplary recreational game in accordance with an embodiment of the present invention.

FIG. 10 is a flowchart of an exemplary recreational game in accordance with an embodiment of the present invention. In an alternative embodiment of the present invention, the recreational object may be simulated as part of a computer game. The recreational object may be used in a variety of games. In step S1000, the recreational object may be displayed, for example, but not limited to, a GUI 940 coupled to a CPU 926, to enable a user to view the operation of the computer operating system and software application. In step S1100, a user input may be received. And in step S1200, the recreational object may be manipulated to achieve a goal of the recreational game. For example, but not limited to, the CPU 926 may be coupled to a pointing device to enable a user with the capability to maneuver a computer cursor about the viewing area of the GUI 940 and select areas or features in the viewing area of the GUI 940. CPU 926 may be coupled to a keyboard 930. The keyboard enables a user with the capability to input alphanumeric textual information to the CPU 926. What follows is a raw listing of a multiplicity of actions that may be performed to achieve a goal of the recreational game, which various embodiments of the present invention may include in any suitable combination. For example, but not limited to, said arm members are adjusted by the application user to increase or decrease the difficulty of the recreational game, the adjustment is increasing or decreasing the number of arm members on said recreational object, the destination is reached by guiding said recreational object through a course comprising obstacles, the obstacles are overcome by adjusting the speed of said recreational object, the obstacles are overcome by adjusting the rotation of said recreational object. What follows is a raw listing of a multiplicity of features to achieve a goal of the recreational game, which various embodiments of the present invention may include in any suitable combination. For example, but not limited to, at least one obstacle is a rod, the rod being located outside the circumference of the central portion but inside an exterior circumference created by the plurality of arm members, wherein the rod is overcome when the application user manipulates said recreational object to rotate past it by adjusting a speed or a rotation of said recreational object, the arm members are colored and the goal of the recreational game is to connect arm members of the same color by manipulating more than one of said recreational objects, said recreational object is displayed on a screen, said recreational object falling at a certain speed and the destination being a target located in a different portion of the screen, the goal of the recreational game is to guide said recreational object to a destination, wherein the destination is reached by guiding said recreational object through a course of obstacles, wherein the obstacles are overcome by adjusting the speed and the rotation of said recreational object. In other embodiments, the recreational object may be simulated as part of a console game or other video game. As a non-limiting example of such a game, the recreational object may function better than a round ball which will hit or touch everything placed within its circumference as it rolls, like in bowling. The recreational object, on the other hand, can be designed to hit or miss objects of various shape and size placed within an exterior circumference created by the arms attached to the ball. The spaces between the arms should be large enough to allow for this. The object can, as a non-limiting example, touch or miss certain obstacles such as a pole. The object can rotate around the pole without touching it if it is within the exterior circumference of the object but outside the circumference of the ball if proper forward speed and rotation is applied. Because of this, a game may be designed in which the object navigates through a course of obstacles that need to be avoided. Additionally, as an example, there may be mandatory points to touch with specific arms. The skill of the player may be shown in selecting a correct forward speed and rotation speed in order to accumulate maximum points by touching designated points and avoiding penalties by avoiding obstacles meant to go between the arms. As non-limiting examples, the forward speed and rotation speed of the recreational object may be controlled by input on a touch screen, by an accelerometer actuated by a smartphone user, or by any adequate system of computer control such as a keyboard or joystick. The difficulty of the game may be adjusted, as a non-limiting example, by choosing an object with a different amount of arms or by including more obstacles in the course.

As a non-limiting example of another game, the objects, with different numbers of arms and different colors on the arms, may be falling at a certain speed from the top of a video game screen, and the goal may be to move and rotate the objects to connect arms of the same color in order to create certain zigzag lanes into various trajectories or structures. In another embodiment, the objects may be falling at various frequencies and the goal of the game may be to have their arms enter a correct circle from a row of circles moving along the bottom of the screen. The CPU may be coupled to a pointing device to enable a user with the capability to maneuver a computer cursor about the viewing area of the GUI and select areas or features in the viewing area of the GUI. CPU may be coupled to a keyboard. The keyboard may enable a user with the capability to input alphanumeric textual information to the CPU.

These examples are meant as non-limiting and it is clear to one skilled in the art that the games which utilize the recreational object at least in part, and the degree of difficulty of these games, can be varied in many more different ways.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 9:
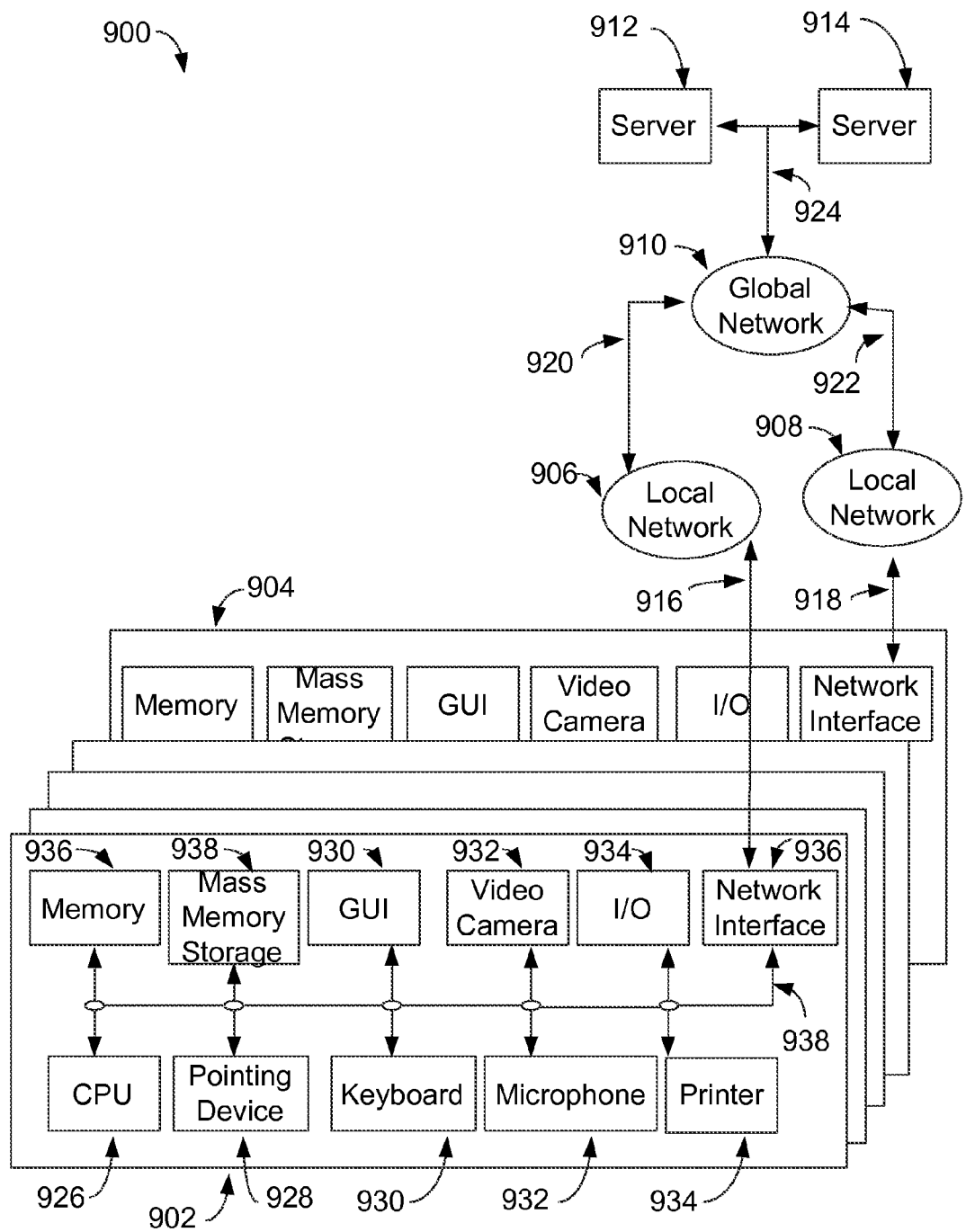
FIG. 9 is a block diagram depicting an exemplary client/server system which may be used by an exemplary web-enabled/networked embodiment of the present invention.

FIG. 9 is a block diagram depicting an exemplary client/server system which may be used by an exemplary web-enabled/networked embodiment of the present invention.

A communication system 900 includes a multiplicity of clients with a sampling of clients denoted as a client 902 and a client 904, a multiplicity of local networks with a sampling of networks denoted as a local network 906 and a local network 908, a global network 910 and a multiplicity of servers with a sampling of servers denoted as a server 912 and a server 914.

Client 902 may communicate bi-directionally with local network 906 via a communication channel 916. Client 904 may communicate bi-directionally with local network 908 via a communication channel 918. Local network 906 may communicate bi-directionally with global network 910 via a communication channel 920. Local network 908 may communicate bi-directionally with global network 910 via a communication channel 922. Global network 910 may communicate bi-directionally with server 912 and server 914 via a communication channel 924. Server 912 and server 914 may communicate bi-directionally with each other via communication channel 924. Furthermore, clients 902, 904, local networks 906, 908, global network 910 and servers 912, 914 may each communicate bi-directionally with each other.

In one embodiment, global network 910 may operate as the Internet. It will be understood by those skilled in the art that communication system 900 may take many different forms. Non-limiting examples of forms for communication system 900 include local area networks (LANs), wide area networks (WANs), wired telephone networks, wireless networks, or any other network supporting data communication between respective entities.

Clients 902 and 904 may take many different forms. Non-limiting examples of clients 902 and 904 include personal computers, personal digital assistants (PDAs), cellular phones and smartphones.

Client 902 includes a CPU 926, a pointing device 928, a keyboard 930, a microphone 932, a printer 934, a memory 936, a mass memory storage 938, a GUI 940, a video camera 942, an input/output interface 944 and a network interface 946.

CPU 926, pointing device 928, keyboard 930, microphone 932, printer 934, memory 936, mass memory storage 938, GUI 940, video camera 942, input/output interface 944 and network interface 946 may communicate in a unidirectional manner or a bi-directional manner with each other via a communication channel 948. Communication channel 948 may be configured as a single communication channel or a multiplicity of communication channels.

CPU 926 may be comprised of a single processor or multiple processors. CPU 926 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 936 is used typically to transfer data and instructions to CPU 926 in a bi-directional manner. Memory 936, as discussed previously, may include any suitable computer-readable media, intended for data storage, such as those described above excluding any wired or wireless transmissions unless specifically noted. Mass memory storage 938 may also be coupled bi-directionally to CPU 926 and provides additional data storage capacity and may include any of the computer-readable media described above. Mass memory storage 938 may be used to store programs, data and the like and is typically a secondary storage medium such as a hard disk. It will be appreciated that the information retained within mass memory storage 938, may, in appropriate cases, be incorporated in standard fashion as part of memory 936 as virtual memory.

CPU 926 may be coupled to GUI 940. GUI 940 enables a user to view the operation of computer operating system and software. CPU 926 may be coupled to pointing device 928. Non-limiting examples of pointing device 928 include computer mouse, trackball and touchpad. Pointing device 928 enables a user with the capability to maneuver a computer cursor about the viewing area of GUI 940 and select areas or features in the viewing area of GUI 940. CPU 926 may be coupled to keyboard 930. Keyboard 930 enables a user with the capability to input alphanumeric textual information to CPU 926. CPU 926 may be coupled to microphone 932. Microphone 932 enables audio produced by a user to be recorded, processed and communicated by CPU 926. CPU 926 may be connected to printer 934. Printer 934 enables a user with the capability to print information to a sheet of paper. CPU 926 may be connected to video camera 942. Video camera 942 enables video produced or captured by user to be recorded, processed and communicated by CPU 926.

CPU 926 may also be coupled to input/output interface 944 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 926 optionally may be coupled to network interface 946 which enables communication with an external device such as a database or a computer or telecommunications or internet network using an external connection shown generally as communication channel 916, which may be implemented as a hardwired or wireless communications link using suitable conventional technologies. With such a connection, CPU 926 might receive information from the network, or might output information to a network in the course of performing the method steps described in the teachings of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing recreational games and objects according to the present invention will be apparent to those skilled in the art. The invention has been described above by way of illustration, and the specific embodiments disclosed are not intended to limit the invention to the particular forms disclosed. The particular implementation of the recreational games and/or objects may vary depending upon the particular context or application. By way of example, and not limitation, the recreational game and objects described in the foregoing were principally directed to physical implementations; however, similar techniques may instead be applied to computer simulated games, which implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A non-transitory program storage device readable by a machine tangibly embodying a program of instructions executable by the machine, the application performing a method consisting of:
    displaying at least a portion of a recreational object, said recreational object comprising:
        a central portion comprising a center core;
        a plurality of arm members in which said plurality of arm members are joined to said central portion, said plurality of arm members each comprising a channel for enabling air passage through said arm members and into said central portion in which the air passage affects a flight speed and a rotational speed of the recreational object passing through air; and
        a casing implement, wherein said casing implement comprises a plurality of casing implements, each having a longer length than each of said plurality of arm members, wherein each of said casing implements being configured to enclose each of said plurality of arm members and form a bubble between each of said plurality of arm members and an end portion of said casing implement, said casing implements further comprising air channels configured to enable air passage to each of said plurality of arm members and limit a speed of flight or a speed of rotation of said recreational object; and
    receiving an input from an application user, wherein said input being operable to manipulate said recreational object to achieve a goal of the recreational game.

2. The non-transitory program storage device of claim 1, wherein said central portion is a sphere shaped central portion.

3. The non-transitory program storage device of claim 1, wherein each of said plurality of arm members are adjustable.

4. The non-transitory program storage device of claim 3, wherein the adjustment is increasing or decreasing the number of arm members on said recreational object.

5. The non-transitory program storage device of claim 1, wherein said recreational object comprises at least fourteen (14) of said plurality of arm members.

6. The non-transitory program storage device of claim 1, wherein said recreational object comprises between six and twenty-two (22) arm members.

7. The non-transitory program storage device of claim 1, wherein the recreational game is a computer, console, or cell phone computerized game.

8. The non-transitory program storage device of claim 1, wherein said input is received through a keyboard, gamepad, or joystick.

9. The non-transitory program storage device of claim 1, wherein said input is received through a utilization of an accelerometer in a cell phone device.

10. The non-transitory program storage device of claim 1, wherein a goal of said recreational game is to guide said recreational object to a destination.

11. The non-transitory program storage device of claim 10, wherein said recreational object is displayed on a screen, said recreational object falling at a certain speed and the destination being a target located in a different portion of the screen.

12. The non-transitory program storage device of claim 11, wherein the destination is reached by guiding said recreational object through a course comprising obstacles.

13. The non-transitory program storage device of claim 12, wherein the obstacles are overcome by adjusting the speed of said recreational object.

14. The non-transitory program storage device of claim 12, wherein the obstacles are overcome by adjusting the speed of a rotation of said recreational object.

15. The non-transitory program storage device of claim 12, wherein at least one obstacle is a rod, the rod being located outside the circumference of said central portion but inside an exterior circumference created by said plurality of arm members.

16. The non-transitory program storage device of claim 1, wherein said plurality of arm members are colored and the goal of said recreational game is to connect arm members of the same color by manipulating more than one of said recreational objects.

17. The non-transitory program storage device of claim 1, wherein the goal of said recreational game is to guide said recreational object to a destination, wherein the destination is reached by guiding said recreational object through a course of obstacles, wherein the obstacles are overcome by adjusting a speed and a rotation of said recreational object.

18. A system for a recreational game, the system consisting of:
   a central portion comprising a center core;
   a plurality of arm members in which said plurality of arm members are joined to said central portion and balanced about said center core, said plurality of arm members each comprising a channel configured for enabling air passage through said plurality of arm members and into said central portion, in which the air passage affects a flight speed and a rotational speed of the recreational object passing through air;
   a casing implement being operable to mitigate damage to other objects from an impact of said recreational object, wherein said casing implement comprises a longer length than each of said plurality of arm members, said casing implement further comprises a plurality of casing implements, each having a hollow space, wherein said casing implement being configured to enclose each of said plurality of arm members in said hollow space, and wherein said longer length forms a bubble between each of said plurality of arm members and an end portion of said plurality of casing implements, in which said bubble being configured for cushioning said impact of said recreational object; and
   in which said casing implement further comprises an air channel being configured to enable an air passage to each of said plurality of arm members and limit a speed of flight or a speed of rotation of said recreational object.

19. A computer program product comprising:
   code for displaying at least a portion of a recreational object, said recreational object consisting of:
      a central portion comprising a center core;
      a plurality of arm members in which said plurality of arm members are joined to said central portion, said plurality of arm members each comprising a channel operable for enabling air passage through said arm members and into said central portion in which the air passage affects a flight speed and a rotational speed of the recreational object passing through air;
      a casing implement, said casing implement comprises a longer length than said plurality of arm members, said casing implement further comprises a plurality of casing implements, each having a hollow space, wherein each of said plurality of casing implements configured to enclose each of said plurality of arm members in said hollow space and said longer length forms a bubble between said arm member and an end portion of said casing implement; and
      said casing implement further comprises an air channel operable to further affect said flight speed and said rotational speed of the recreational object passing through air;
   code for receiving input from a user, said input operable to manipulate said recreational object to achieve a goal of the recreational game; and
   a non-transitory computer-readable medium storing said computer code.

* * * * *